United States Patent
Fukushima

(12) United States Patent (10) Patent No.: US 12,057,247 B2
(45) Date of Patent: Aug. 6, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventor: Daichi Fukushima, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 390 days.

(21) Appl. No.: 17/628,714

(22) PCT Filed: Jul. 8, 2020

(86) PCT No.: PCT/JP2020/026679
§ 371 (c)(1),
(2) Date: Jan. 20, 2022

(87) PCT Pub. No.: WO2021/020058
PCT Pub. Date: Feb. 4, 2021

(65) Prior Publication Data
US 2022/0262545 A1    Aug. 18, 2022

(30) Foreign Application Priority Data
Jul. 26, 2019 (JP) .................. 2019-138107

(51) Int. Cl.
*H01B 7/40* (2006.01)
*C09J 7/10* (2018.01)
(Continued)

(52) U.S. Cl.
CPC .............. *H01B 7/40* (2013.01); *C09J 7/10* (2018.01); *C09J 7/30* (2018.01); *H01B 3/441* (2013.01);
(Continued)

(58) Field of Classification Search
CPC ....................................... H01B 7/40
(Continued)

(56) References Cited

U.S. PATENT DOCUMENTS 5,462,911 A * 10/1995 Takao ............ B41M 5/52
503/227
5,888,324 A    3/1999 Nakamura et al.
(Continued)

FOREIGN PATENT DOCUMENTS

JP    9-306244    11/1997
JP    9-306259    11/1997
(Continued)

OTHER PUBLICATIONS

International Search Report issued in International Patent Application No. PCT/JP2020/026679, dated Sep. 24, 2020, along with an English translation thereof.
(Continued)

*Primary Examiner* — Stanley Tso
(74) *Attorney, Agent, or Firm* — GREENBLUM & BERNSTEIN, P.L.C.

(57) ABSTRACT

A wiring member includes: a wire-like transmission member having a transmission wire body and a covering layer covering the transmission wire body; an adherend having an inorganic layer on a surface; and an adhesive agent intervening between the covering layer and the inorganic layer to be bonded to the covering layer and the inorganic layer, wherein the adhesive agent contains a chemical compound including at least one resin side functional group and at least (Continued)

one inorganic material side functional group in a molecular structure, the resin side functional group is chemically bonded to resin constituting the covering layer, and the inorganic material side functional group is chemically bonded to an inorganic material constituting the inorganic layer.

6 Claims, 1 Drawing Sheet

(51) Int. Cl.
  *C09J 7/30* (2018.01)
  *H01B 3/44* (2006.01)
(52) U.S. Cl.
  CPC .... *C09J 2203/326* (2013.01); *C09J 2400/166* (2013.01); *C09J 2423/008* (2013.01); *C09J 2427/008* (2013.01); *C09J 2483/00* (2013.01)
(58) Field of Classification Search
  USPC ..................................................... 174/110 V
  See application file for complete search history.

(56) References Cited

U.S. PATENT DOCUMENTS

| 2020/0172027 A1 | 6/2020 | Mizuno et al. |
| 2020/0269779 A1 | 8/2020 | Aramaki et al. |

FOREIGN PATENT DOCUMENTS

| JP | 2005-281535 | 10/2005 |
| JP | 2006-199851 | 8/2006 |
| JP | 2009-170113 | 7/2009 |
| JP | 2019-3925 | 1/2019 |
| JP | 2019-85027 | 6/2019 |
| WO | 2018/181517 | 10/2018 |

OTHER PUBLICATIONS

International Preliminary Report on Patentability issued in International Patent Application No. PCT/JP2020/026679, dated Feb. 1, 2022, along with an English translation thereof.
Japanese Office Action issued in Japanese Patent Application No. 2019-138107 dated Aug. 23, 2022.
Chinese Office Action received in CN Application No. 202080051607.6, dated Jul. 27, 2023.

\* cited by examiner

WIRING MEMBER

TECHNICAL FIELD

The present disclosure relates to a wiring member.

BACKGROUND ART

Patent document 1 discloses a wire harness in which a wire-like transmission member is bonded to a component mounted to a vehicle.

PRIOR ART DOCUMENTS

Patent Documents

Patent Document 1: Japanese Patent Application Laid-Open No. 2019-85027

SUMMARY

Problem to be Solved by the Invention

Desired is that a wire-like transmission member and an adherend which is an inorganic layer having a surface made of metal, for example, is favorably bonded to each other.

An object is to provide a technique of favorably bonding a wire-like transmission member and an adherend which is an inorganic layer having a surface made of metal, for example.

Means to Solve the Problem

A wiring member according to the present disclosure is a wiring member including: a wire-like transmission member having a transmission wire body and a covering layer covering the transmission wire body; an adherend having an inorganic layer on a surface; and an adhesive agent intervening between the covering layer and the inorganic layer to be bonded to the covering layer and the inorganic layer, wherein the adhesive agent contains a chemical compound including at least one resin side functional group and at least one inorganic material side functional group in a molecular structure, the resin side functional group is chemically bonded to resin constituting the covering layer, and the inorganic material side functional group is chemically bonded to an inorganic material constituting the inorganic layer.

Effects of the Invention

According to the present disclosure, a wire-like transmission member and an adherend which is an inorganic layer having a surface made of metal, for example, is favorably bonded to each other.

DESCRIPTION OF EMBODIMENT(S)

Description of Embodiment of Present Disclosure

Figure 1:
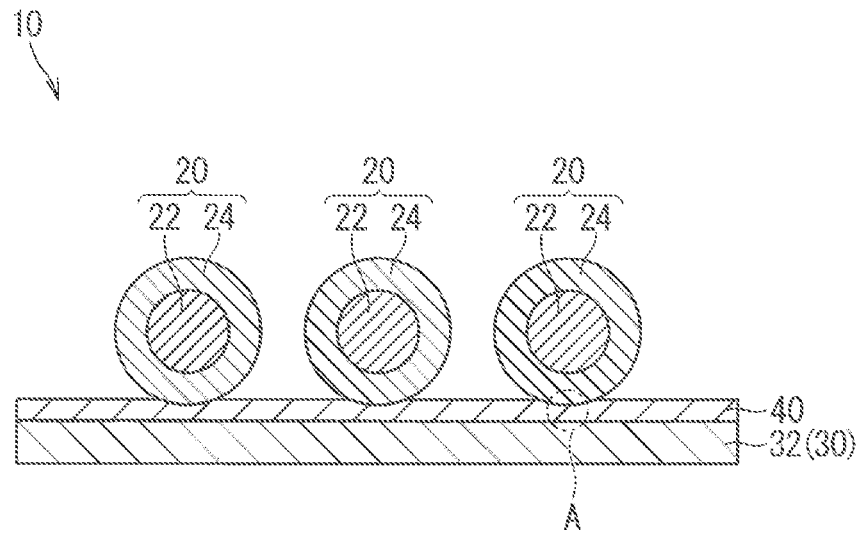
FIG. 1 is a cross-sectional view illustrating a wiring member according to an embodiment.

Embodiments of the present disclosure are listed and described firstly.

A wiring member according to the present disclosure is as follows.

(1) A wiring member includes: a wire-like transmission member having a transmission wire body and a covering layer covering the transmission wire body; an adherend having an inorganic layer on a surface; and an adhesive agent intervening between the covering layer and the inorganic layer to be bonded to the covering layer and the inorganic layer, wherein the adhesive agent contains a chemical compound including at least one resin side functional group and at least one inorganic material side functional group in a molecular structure, the resin side functional group is chemically bonded to resin constituting the covering layer, and the inorganic material side functional group is chemically bonded to an inorganic material constituting the inorganic layer. The resin side functional group is chemically bonded to the resin constituting the covering layer, and the inorganic material side functional group is chemically bonded to the inorganic material constituting the inorganic layer, thus the electrical wire and the adherend are favorably bonded to each other.

(2) It is also applicable that the inorganic material side functional group is an alkoxy group, and the chemical compound further includes silicon bonding the alkoxy group and the resin side functional group in the molecular structure. Accordingly, the adhesive agent is favorably bonded to the inorganic layer.

(3) It is also applicable that the inorganic material is metal, and the inorganic material side functional group is a chelate group. Accordingly, the metal and the chelate group are chemically bonded while forming a chelate complex, thus the adhesive agent is favorably bonded to the metal inorganic layer.

(4) It is also applicable that the resin is polyvinyl chloride, and the resin side functional group is one type or two or more types of functional group selected from a group made up of an amino group, a thiol group, and an epoxy group. Accordingly, the adhesive agent is favorably bonded to the polyvinyl chloride covering layer.

(4) It is also applicable that the resin is polyolefin, and the resin side functional group is one type or two or more types of functional group selected from a group made up of an amino group, a thiol group, a vinyl group, an acrylic group, a methacryl group, and an epoxy group. Accordingly, the adhesive agent is favorably bonded to the polyolefin covering layer.

(6) The chemical compound may be a polymer in which the plurality of resin side functional groups and the plurality of inorganic material side functional groups are bonded to a molecular chain. Accordingly, the number of functional groups in one chemical compound is increased, thus an adhesion property is improved.

(7) It is also applicable that the adherend is a sheet-like member, and the wire-like transmission member is disposed on a main surface of the inorganic layer in the sheet-like member. Accordingly, the wire-like transmission member is favorably bonded to the inorganic layer in the sheet-like member.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment

Figure 2:
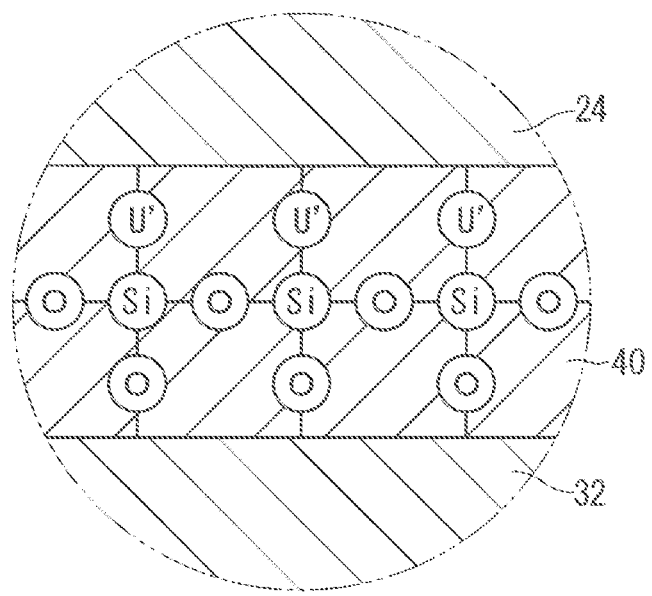
FIG. 2 is a schematic drawing in a region A1 in FIG. 1.

A wiring member 10 according to an embodiment is described hereinafter. FIG. 1 is a cross-sectional plan view illustrating the wiring member 10 according to an embodiment 1. FIG. 2 is a schematic drawing in a region A1 in FIG. 1. FIG. 2 is a schematic drawing illustrating that a chemical compound included in an adhesive agent 40 is chemically bonded to a covering layer 24 and an inorganic layer 32.

The wiring member 10 includes a wire-like transmission member 20, an adherend 30, and the adhesive agent 40. The wiring member 10 is mounted to a vehicle, for example. The wiring member 10 is used as a wiring connecting electrical components in the vehicle, for example.

The wire-like transmission member 20 may be a wire-like member transmitting an electrical power or light, for example. The wire-like transmission member 20 includes a transmission wire body 22 and a covering layer 24. The transmission wire body 22 transmits an electrical power or light. The covering layer 24 covers the transmission wire body 22. An outermost layer of the covering layer 24 is a resin layer. For example, the wire-like transmission member 20 may be an electrical wire. The electrical wire includes a core wire as the transmission wire body 22 and an insulation layer as the covering layer 24. The core wire is a wire-like conductor formed by a metal conductive member, for example. The insulation layer is an insulating part covering around the core wire. For example, the wire-like transmission member 20 may be a shielded wire, a twisted wire, an enamel wire, or an optical fiber in addition to the electrical wire.

The adherend 30 includes an inorganic layer 32 on a surface thereof. In the description herein, the inorganic layer 32 is a metal layer. The inorganic layer 32 may be a glass layer, for example. The wire-like transmission member 20 is fixed to the adherend 30.

In the description herein, the adherend 30 is the sheet-like member 30. The adherend 30 may be a panel, for example. On main surface of the sheet-like member 30 constitutes the metal layer 32. The sheet-like member 30 may have a single layer structure including only the metal layer 32. The sheet-like member 30 may have a multilayer structure in which the other layer is stacked on the metal layer 32. The layer stacked on the metal layer 32 may be a metal layer made up of metal different from that of the metal layer 32 as a material, or may also be a resin layer.

The plurality of wire-like transmission members 20 are disposed a one main surface of the metal layer 32 in the sheet-like member 30. Accordingly, the wiring member 10 constitutes the flat wiring member 10. For example, the plurality of wire-like transmission members 20 may be wired in a state of following a route in a vehicle on the sheet-like member 30. For example, the plurality of wire-like transmission members 20 may also be bended and disposed on the sheet-like member 30. For example, the plurality of wire-like transmission members 20 may be branched in accordance with a position of each electrical component to which the wire-like transmission members 20 are connected. In this case, a branch part may be fixed on the sheet-like member 30. The plurality of wire-like transmission members 20 may also be stacked in layers on the sheet-like member 30. The plurality of wire-like transmission members 20 may intersect on the sheet-like member 30.

An end portion of each wire-like transmission member 20 is connected to an electrical component via a connector, for example. The end portion of the wire-like transmission member 20 may extend from the sheet-like member 30 to an outer side. A connector, for example, may be provided on the sheet-like member 30.

The adhesive agent 40 intervenes between the covering layer 24 and inorganic layer 32. In the example illustrated in FIG. 1, the adhesive agent 40 is provided on a whole surface of the inorganic layer 32, however, this configuration is not necessary. The adhesive agent 40 may be provided on a part of the surface of the inorganic layer 32 as long as the adhesive agent 40 is provided between the covering layer 24 and inorganic layer 32. For example, the adhesive agent 40 is bonded to the covering layer 24 and inorganic layer 32. A main component of the adhesive agent 40 is not particularly limited. The main component of the adhesive agent 40 may be epoxy resin, silicone, modified silicone, acrylic resin, or cyanoacrylate series resin, for example. The adhesive agent 40 contains a chemical compound C1 (a chemical compound of Formula (1)) described below.

[Chemical formula 1]

$$U\text{—}V\text{—}W \quad (1)$$

Herein, U in Formula (1) is a resin side functional group. V in Formula (1) is an optional molecular chain. Herein, W in Formula (1) is an inorganic material side functional group. That is to say, the chemical compound C1 is a chemical compound including both a resin side functional group U and an inorganic material side functional group W in the molecular structure.

The resin side functional group U is chemically bonded to the resin constituting the covering layer 24. The inorganic material side functional group W is chemically bonded to an inorganic material constituting the inorganic layer 32 (herein, metal constituting the metal layer 32). Types of chemical bonding of the resin side functional group U and the resin constituting the covering layer 24 and chemical bonding of the inorganic material side functional group W and the inorganic material constituting the inorganic layer 32 are not particularly limited. Types of chemical bonding of the resin side functional group U and the resin constituting the covering layer 24 and chemical bonding of the inorganic material side functional group W and the inorganic material constituting the inorganic layer 32 may be the same as or different from each other. For example, the type of each chemical bonding may be one type or two or more types of chemical bonding selected from a group made up of a covalent bonding, an ion bonding, and van der Waals' force.

The inorganic material side functional group W may be an alkoxy group. A type of the alkoxy group is not particularly limited. For example, a methoxy group or an ethoxy group is also applicable as the alkoxy group. The number of the alkoxy groups bonded to one atom may be one, or may also be two or three. That is to say, the alkoxy group may be a monoalkoxy group, a dialkoxy group (a dimethoxy group or a diethoxy group, for example), or a trialkoxy group (a trimethoxy group or a triethoxy group, for example).

The chemical compound C1 may further include silicon bonding the alkoxy group and the resin side functional group U in the molecular structure. The chemical compound C1 may be made of silicon to which the alkoxy group is bonded. The chemical compound C1 made of silicon to which the alkoxy group is bonded is a chemical compound such as a chemical compound C2 (a chemical compound expressed by Formula (2)) described hereinafter. The chemical compound C2 is also referred to as a silane coupling agent, for example.

[Chemical formula 2]

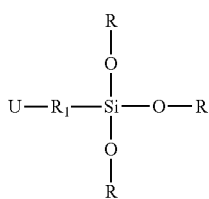
(2)

Herein. R in Formula (2) is an alkyl group such as a methyl group or an ethyl group, for example. R1 in Formula (2) is an optional molecular chain. For example, R1 may be an alkyl chain having one to three carbons.

The alkoxy group in the chemical compound C2 is chemically bonded to an inorganic material such as metal as described hereinafter, for example. That is to say, the alkoxy group in the chemical compound C2 is hydrolyzed into a hydroxyl group. At this time, an alkyl group R becomes alcohol (methanol or ethanol) and is discharged. The hydroxyl group reacts chemically with a hydroxyl group in a surface of the inorganic material (dehydration condensation). There may also be a case where one of the three alkoxy groups bonded to silicon in one chemical compound C2 reacts chemically with the inorganic material and the other alkoxy group reacts chemically with an alkoxy group in the other chemical compound C2 (dehydration condensation). That is to say, the plurality of chemical compounds C2 may be condensation polymerized. For example, a reactant generated in which two chemical compounds C2 are condensation polymerized and one chemical compound C2 condensation reacts with the inorganic material is a chemical compound C3 (a chemical compound expressed by Formula (3)) described hereinafter. Needless to say, three or more chemical compounds C2 may be condensation polymerized. FIG. 2 is a schematic drawing illustrating that three or more chemical compounds C2 are condensation polymerized to be bonded to the covering layer 24 and the inorganic layer 32. U' in FIG. 2 is a part in which a U—R1 part is bonded to the covering layer 24.

[Chemical formula 3]

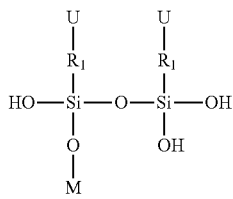
(3)

Herein, M in Formula (3) indicates an inorganic material such as metal, for example.

The resin constituting the covering layer 24 may be polyvinyl chloride. In this case, the resin side functional group U may be one type or two or more types of functional group selected from a group made up of an amino group, a thiol group, and an epoxy group. For example, halogen displacement reaction is generated between an amino group and polyvinyl chloride and between a thiol group and polyvinyl chloride.

A reactant of the chemical compound C2 in which the resin side functional group U is the amino group and polyvinyl chloride is a chemical compound C4 (a chemical compound expressed by Formula (4)) described hereinafter.

[Chemical formula 4]

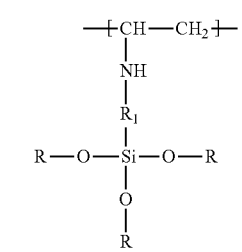
(4)

A reactant of the chemical compound C2 in which the resin side functional group U is the thiol group and polyvinyl chloride is a chemical compound C5 (a chemical compound expressed by Formula (5)) described hereinafter.

[Chemical formula 5]

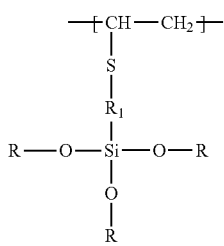
(5)

The resin constituting the covering layer 24 may be polyolefin. In this case, the resin side functional group U may be one type or two or more types of functional group selected from a group made up of an amino group, a thiol group, a vinyl group, an acrylic group, a methacryl group, and an epoxy group. For example, generated is an additional reaction on a double bond between a vinyl group and polyolefin, between an acrylic group and polyolefin, and between a methacryl group and polyolefin.

A reactant of the chemical compound C2 in which the resin side functional group U is the vinyl group and polyolefin is a chemical compound C6 (a chemical compound expressed by Formula (6)) described hereinafter.

[Chemical formula 6]

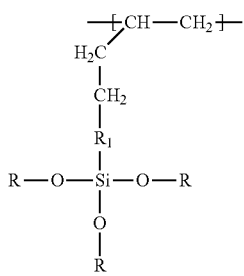
(6)

A reactant of the chemical compound C2 in which the resin side functional group U is the methacryl group and polyolefin is a chemical compound C7 (a chemical compound expressed by Formula (7)) described hereinafter.

[Chemical formula 7]

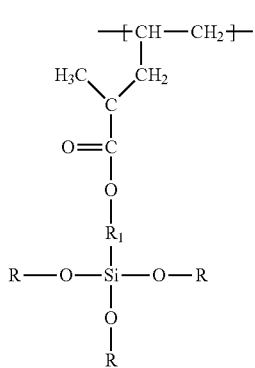

(7)

According to the wiring member 10 having the above configuration, the resin side functional group U in the chemical compound C1 is chemically bonded to the resin constituting the covering layer 24, and the inorganic material side functional group W is chemically bonded to the inorganic material constituting the inorganic layer 32, thus the wire-like transmission member 20 and the adherend 30 can be favorably bonded to each other.

The inorganic material side functional group W is the alkoxy group and the chemical compound C1 further includes silicon connecting the alkoxy group and the resin side functional group U in the molecular structure, thus the adhesive agent 40 is favorably bonded to the inorganic layer 32.

When the resin constituting the covering layer 24 is polyvinyl chloride and the resin side functional group U is one or two or more types of functional group selected from the group made up of the amino group, the thiol group, and the epoxy group, the adhesive agent 40 is favorably bonded to the polyvinyl chloride covering layer 24.

When the resin constituting the covering layer 24 is polyolefin and the resin side functional group U is one or two or more types of functional group selected from the group made up of the amino group, the thiol group, the vinyl group, the acrylic group, the methacryl group, and the epoxy group, the adhesive agent 40 is favorably bonded to the covering layer 24 made of polyolefin.

The adherend 30 is the sheet-like member 30, and the wire-like transmission member 20 is disposed on the main surface of the inorganic layer 32 in the sheet-like member 30, thus the wire-like transmission member 20 is favorably bonded to the inorganic layer 32 in the sheet-like member 30. When the wire-like transmission member 20 is the electrical wire and the inorganic layer 32 is the metal layer 32, the heat of the electrical wire is easily radiated via the metal layer 32. Accordingly, the heat radiation property in the wiring member 10 is increased.

Modification Example

The chemical compound C1 may be a polymer in which the plurality of resin side functional groups U and the plurality of inorganic material side functional groups W are bonded to a molecular chain. The molecular chain may be an alkyl chain or a siloxane chain, for example.

The chemical compound C1 whose molecular chain is the alkyl chain is a chemical compound such as a chemical compound C8 (a chemical compound expressed by Formula (8)) described hereinafter.

[Chemical formula 8]

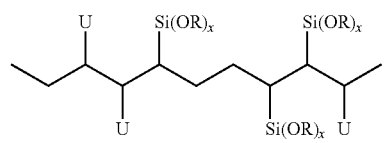

(8)

Herein, x in Formula (8) is an integral number of any one of one to three.

The chemical compound C1 whose molecular chain is the siloxane chain is a chemical compound such as a chemical compound C9 (a chemical compound expressed by Formula (9)) described hereinafter.

[Chemical formula 9]

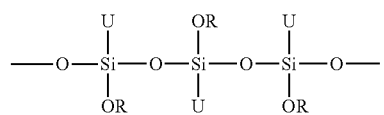

(9)

When the chemical compound C1 is the polymer in which the plurality of resin side functional groups U and the plurality of inorganic material side functional groups W are bonded to the molecular chain, the number of functional groups in one chemical compound C1 is increased, thus the adhesion property on the covering layer 24 and the inorganic layer 32 is improved. When the chemical compound C1 is the polymer in which the plurality of resin side functional groups U and the plurality of inorganic material side functional groups W are bonded to the molecular chain, volatility is easily reduced.

The chemical compound C2 may be a silane coupling agent in a silanol state in which the alkoxy group is previously hydrolyzed to be the hydroxyl group. In this case, an occurrence of alcohol at a point of use can be suppressed. Accordingly, reduction in a volatile organic compound can be achieved.

In the description of the embodiment, the inorganic material side functional group W is the alkoxy group, however, this configuration is not necessary. The inorganic material side functional group W may be the chelate group. In this case, the inorganic material is preferably metal. The chelate group and the metal are chemically bonded while forming the chelate complex. Accordingly, the adhesive agent 40 is favorably bonded to the metal inorganic layer 32.

The chelate group is not particularly limited. For example, the chelate group may be one type or two or more types of chelate group selected from a group of polyphosphoric acid, aminocarboxylic acid, 1,3-diketone, acetoacetic acid (ester), hydroxycarboxylic acid, polyamine, amino alcohol, aromatic heterocyclic base, phenol, oxime, Schiff base, tetrapyrrole, sulfur compound, synthetic macrocyclic compound, sulfonic acid, and hydroxy ethylidene sulfonic acid.

In the compound in which the inorganic material side functional group W is the chelate group, the resin side functional group U is not particularly limited. For example, the resin side functional group U may be one type or two or more types of functional group selected from a group made up of an amino group, a thiol group, a vinyl group, an acrylic group, a methacryl group, and an epoxy group.

A chemical compound in which the resin side functional group U is the amino group or the thiol group and the inorganic material side functional group W is the chelate group is manufactured as below, for example.

Prepared firstly are a chemical compound C10 having the chelate group (a chemical compound expressed by Formula (10)) and a chemical compound C11 having the resin side functional group U (a chemical compound expressed by Formula (11)).

[Chemical formula 10]

W—COOH      (10)

[Chemical formula 11]

HO—R—U-A      (11)

Herein. A in Formula (11) is a protective group.

Next, the chemical compound C10 and the chemical compound C11 react with each other, and a chemical compound C12 (a chemical compound expressed by Formula (12)) is obtained.

[Chemical formula 12]

W—COO—R—U-A      (12)

Then, the chemical compound C12 deprotection reacts, thus the chemical compound in which the resin side functional group U is the amino group or the thiol group and the inorganic material side functional group W is the chelate group can be obtained.

When the resin side functional group U is the vinyl group, the acrylic group, or the methacryl group, the chemical compound C11 may not include the protective group A. That is to say, the chemical compound which does not include the protective group A reacts with the chemical compound C10, thus obtained without an intervention of the chemical compound C12 is the chemical compound in which the resin side functional group U is the vinyl group, the acrylic group, or the methacryl group and the inorganic material side functional group W is the chelate group.

A chemical compound in which the resin side functional group U is the epoxy group and the inorganic material side functional group W is the chelate group is manufactured as below, for example.

Prepared firstly are a chemical compound C13 having the chelate group (a chemical compound expressed by Formula (13)) and a chemical compound C14 having the resin side functional group U (a chemical compound expressed by Formula (14)).

[Chemical formula 13]

[A—OOC$\frac{}{x}$W—OM      (13)

[Chemical formula 14]

X—R—U      (14)

Next, the chemical compound C13 and the chemical compound C14 react, and a chemical compound C15 (a chemical compound expressed by Formula (15)) is obtained.

[Chemical formula 15]

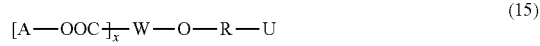

[A—OOC$\frac{}{x}$W—O—R—U      (15)

Then, the chemical compound C15 deprotection reacts, thus the chemical compound in which the resin side functional group U is the epoxy group and the inorganic material side functional group W is the chelate group can be obtained.

Also in a case of a chemical compound in which the inorganic material side functional group W is the chelate group, the plurality of resin side functional groups U and the plurality of inorganic material side functional groups W may be bonded to the molecular chain as with the chemical compound C8 or C9.

In addition, the adhesive agent 40 may also include a filler. The filler is a member having higher thermal conductivity than the resin as a main component. The filler may include an inorganic filler or a metal filler. Applicable as a material of the inorganic filler is silica, aluminum oxide, magnesium oxide, beryllium oxide, boron nitride, aluminum nitride, silicon nitride, silicon carbide, boron carbide, titanium carbide, mullite, graphite, and carbon nanotube, for example. Copper, aluminum, silver, and iron is applicable as a material of the metal filler.

Each configuration described in the embodiment and each modification example can be appropriately combined as long as they are not contradictory.

Explanation of Reference Signs

10 wiring member
20 wire-like transmission member
22 transmission wire body
24 covering layer
30 adherend (sheet-like member)
32 inorganic layer (metal layer)
40 adhesive agent

The invention claimed is:

1. A wiring member, comprising:
a wire-like transmission member including a transmission wire body and a covering layer covering the transmission wire body;
an adherend including an inorganic layer on a surface; and
an adhesive agent intervening between the covering layer and the inorganic layer to be bonded to the covering layer and the inorganic layer, wherein
the adhesive agent contains a chemical component including at least one resin side functional group and at least one inorganic material side functional group in a molecular structure,
the resin side functional group is chemically bonded to resin constituting the covering layer,
the inorganic material side functional group is chemically bonded to an inorganic material constituting the inorganic layer, wherein
the inorganic material is metal, and
the inorganic material side functional group is a chelate group.

2. The wiring member according to claim 1, wherein the inorganic material side functional group is an alkoxy group, and the chemical compound further includes silicon bonding the alkoxy group and the resin side functional group in the molecular structure.

3. The wiring member according to claim 1, wherein
the resin is polyvinyl chloride, and
the resin side functional group is one type or two or more types of functional group selected from a group made up of an amino group, a thiol group, and an epoxy group.

4. The wiring member according to claim 1, wherein
the resin is polyolefin, and
the resin side functional group is one type or two or more types of functional group selected from a group made up of an amino group, a thiol group, a vinyl group, an acrylic group, a methacryl group, and an epoxy group.

5. The wiring member according to claim 1, wherein
the chemical compound is a polymer in which the plurality of resin side functional groups and the plurality of inorganic material side functional groups are bonded to a molecular chain.

6. The wiring member according to claim 1, wherein
the adherend is a sheet-like member, and
the wire-like transmission member is disposed on a main surface of the inorganic layer in the sheet-like member.

* * * * *